US006635150B1

(12) United States Patent
Le Goff et al.

(10) Patent No.: US 6,635,150 B1
(45) Date of Patent: Oct. 21, 2003

(54) METHOD FOR DISTILLING A FLUID WITH HORIZONTAL VAPOR TRANSFER INTO A CONDENSATION ZONE AND MODULAR DEVICE FOR IMPLEMENTING SAID METHOD

(75) Inventors: Pierre Le Goff, Nancy (FR); Jean-Marie Hornut, Villers le Sec (FR); Viviane Renaudin, Villers les Nancy (FR)

(73) Assignee: Centre International de l'Eau de Nancy - Nancie, Vandoeuvre les Nancy Cédex (FR)

( * ) Notice: Subject to any disclaimer, the term of this patent is extended or adjusted under 35 U.S.C. 154(b) by 0 days.

(21) Appl. No.: 09/744,354
(22) PCT Filed: Jul. 9, 1999
(86) PCT No.: PCT/FR99/01674
§ 371 (c)(1),
(2), (4) Date: Jan. 23, 2001
(87) PCT Pub. No.: WO00/04968
PCT Pub. Date: Feb. 3, 2000

(30) Foreign Application Priority Data

Jul. 24, 1998 (FR) .............................. 98 09668

(51) Int. Cl.[7] .............................. B01D 1/26; B01D 1/22; C02F 1/08; F28D 3/00
(52) U.S. Cl. .................... 203/11; 159/2.1; 159/13.1; 159/17.2; 159/28.6; 159/43.1; 159/49; 159/DIG. 8; 159/DIG. 28; 159/DIG. 16; 165/166; 165/167; 202/83; 202/174; 202/205; 202/236; 203/25; 203/27; 203/72; 203/73; 203/91; 203/88; 203/89; 203/DIG. 8; 203/DIG. 17

(58) Field of Search .................. 202/172, 205, 202/173, 83, 174, 182, 236, 186, 25, 27, 72, 91, 87, 73, 80, 88, 89, DIG. 8, 11, DIG. 17; 159/DIG. 8, 49, 2.1, 17.2, 43.1, 28.6, 13.1, 23, DIG. 28, DIG. 16; 165/165, 166, 167

(56) References Cited

U.S. PATENT DOCUMENTS 3,768,539 A * 10/1973 Chamberlin et al. ....... 159/13.2

(List continued on next page.)

FOREIGN PATENT DOCUMENTS

BE 1002903 7/1991

(List continued on next page.)

OTHER PUBLICATIONS

Patent Abstracts of Japan, vol. 005, No. 035 (C–046) Published: Mar. 5, 1981.

Primary Examiner—Virginia Manoharan
(74) Attorney, Agent, or Firm—Gary M. Cohen

(57) ABSTRACT

A method for distilling a fluid which is useful, for instance, in eliminating salt from brackish and/or sea water includes percolating films on plates with multiple effects having several evaporating zones and condensation zones. The evaporation zones (EVAP) and the condensation zones (COND) are vertically arranged. The liquid to be distilled emerges in the top part of the evaporation zone (EVAP). The vapors produced in the evaporation zone (EVAP) are horizontally transferred into the condensation zone (COND) through a communicating connection. The condensed liquid percolates vertically along the walls of the condensation zone and is evacuated from the lower part of the condensation zone. A distilling plant is also provided for implementing the distilling method, and includes plural cascades made up of elementary cells alternatingly assembled in thermal series.

22 Claims, 2 Drawing Sheets

U.S. PATENT DOCUMENTS 3,788,954 A * 1/1974 Cantrell .................... 159/13.1
4,402,793 A * 9/1983 Petrek et al. ............... 202/174
5,840,159 A * 11/1998 Rosenblad ................. 203/10
5,968,321 A * 10/1999 Sears ....................... 159/24.1

FOREIGN PATENT DOCUMENTS

| DE | 2722288 | 12/1977 |
| EP | 0046528 | 3/1982 |
| EP | 0276176 | 7/1988 |
| FR | 2666517 | 3/1992 |
| JP | 55159802 | 12/1980 |

* cited by examiner

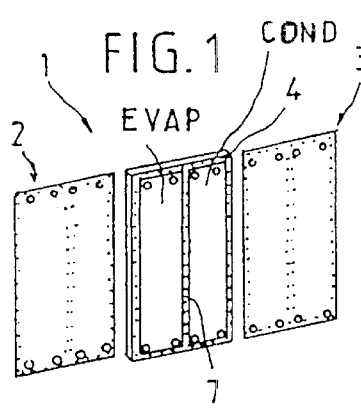
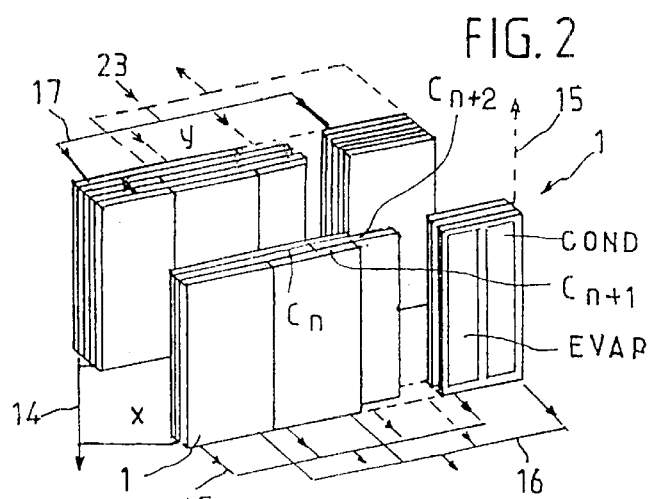
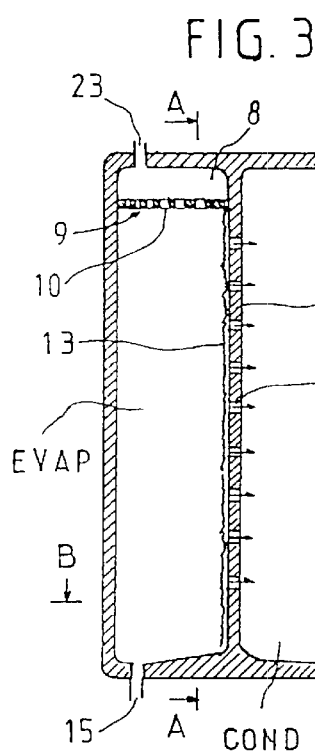
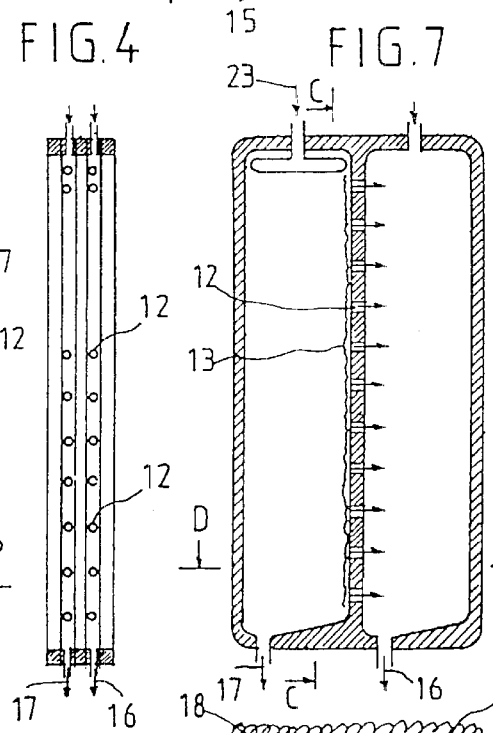
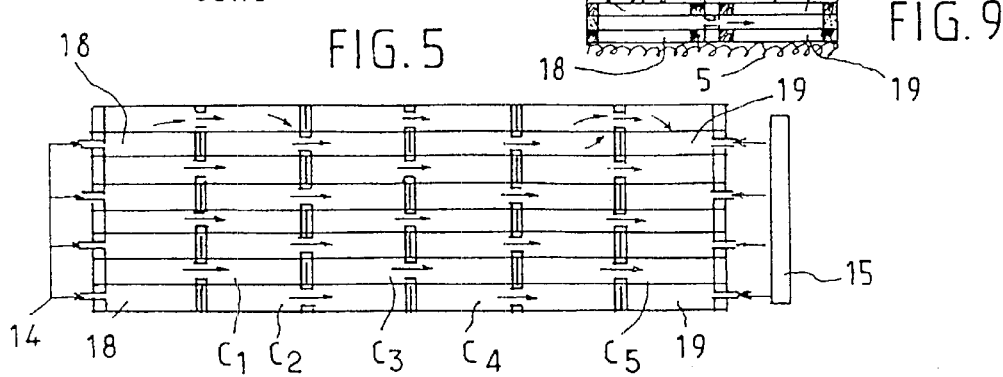

METHOD FOR DISTILLING A FLUID WITH HORIZONTAL VAPOR TRANSFER INTO A CONDENSATION ZONE AND MODULAR DEVICE FOR IMPLEMENTING SAID METHOD

BACKGROUND OF THE INVENTION

The present invention relates to a process and to an apparatus having a modular structure for the distillation of a fluid. The present invention has particular applicability to the desalination of briny water and/or sea water, although other applications are also possible.

Known desalination techniques can be classified according to three large families, depending on the process which is applied. These families include processes involving a change of phase (namely, freezing and distillation), processes using membranes (namely reverse osmosis and electrodialysis), and processes acting on chemical bonds (namely ion exchange, extraction by solvents and the formation of hydrates).

Distinguished among the most tried and tested techniques that have reached an industrial stage are the membrane techniques, such as reverse osmosis, electrodialysis and multistage flash distillation or multiple-effect distillation processes.

Reverse osmosis is a process for separating water from dissolved salts by means of membranes due to the action of pressure. This process operates at room temperature.

Electrodialysis is a process which demineralizes briny water by migration of the various ions through selective membranes which are subjected to the action of an electric field. The electric field results from the application of a DC potential difference between two electrodes delimiting the selective membranes.

A multistage flash distillation process is based on the distillation of sea water which has been preheated to a temperature which varies between 80 and 120° C. This distillation derives from successive expansions of the sea water within a series of cells, and is based on the principle of vacuum evaporation of part of the sea water which has been preheated to a temperature which varies between 70 and 80° C. This evaporation, which takes place on an exchange surface, unlike the previous process which takes place by expansions within the cells, results from the transfer of heat given up either by condensation of the steam (latent heat) coming from a boiler or by the cooling of hot water from a heat recuperator.

The technique employed in accordance with the present invention falls within this latter category, and is based on falling-film exchanger technologies in which films run down multiple-effect plates. A multi-usage flash evaporator of this type is described, for example, in French Patent Application FR 2 666 517.

Water production plants falling within this latter category are very widely used throughout the world. However, the overall investment and operating costs of such facilities remain higher than those of the other two types of processes. More than 50% of the cost of the overall investment is tied up in the distillation unit itself.

SUMMARY OF THE INVENTION

The present invention therefore has as its objective to provide a distillation unit of an entirely novel structure so as to significantly reduce the cost of the plant.

To achieve this objective, a modular distillation unit is provided which operates on a novel process and which results from the assembly of a large number of simple elementary components which are either commercially available or easy to manufacture in high volume and for a low cost (even in low-technology countries).

To achieve this, an elementary evaporation/condensation cell for a falling-film distillation unit based on films running down multiple-effect plates is provided. The volume of the structure is bounded by two metal plates forming the walls of the cell. The plates are held vertically and are separated by a spacer frame. The spacer frame is divided by a longitudinal central member into two distinct zones which are substantially identical and which communicate with each other, which will hereafter be called the evaporation zone and the condensation zone, respectively.

The evaporation zone is fed with fluid to be distilled via a feed circuit which enters the upper part of the evaporation zone. The fluid to be distilled runs down the two walls of the cell, as a thin film. Excess unevaporated liquid or concentrate is recovered in the lower part of the evaporation zone via a concentrate circuit, and the distilled fluid is recovered in the lower part of the condensation zone via a distillate circuit. The evaporation and condensation zones communicate with each other via a series of calibrated holes provided in the central member. An anti-collapse device is optionally provided inside the cell if the cell is to be maintained at a reduced pressure.

In a first embodiment, a manifold is defined by a transverse member which is drilled with a plurality of calibrated holes and which is fastened in the upper part of the cell between a member of the spacer frame and the central member. In another embodiment, the manifold is formed by a tube which is drilled with a plurality of calibrated holes and which is placed transversely in the upper part of the evaporation zone.

As an example, the anti-collapse device is a very wide-celled corrugated mesh. Preferably, a porous mat is applied to the inside of the evaporation zone, against the central member, and covers the surface which includes the communicating holes. The elementary cell also preferably includes a turbulence-promoting and falling-film-stabilizing structure.

A falling-film distillation unit based on films running down multiple-effect plates, in accordance with the present invention, includes at least one elementary cell having the above characteristics.

In a preferred embodiment, the distillation unit of the present invention includes a set of elementary cells assembled in thermal series. The condensation zone of a cell (n) heats the evaporation zone of a cell (n+1) of the thermal series. The evaporation zone of the first cell of the series is heated by a heating-cell through which an external heat-transfer fluid passes, and the condensation zone of the last cell of the series is cooled by a cooling cell through which a coolant flows. The elementary cells of a thermal series are mounted alternately, in two parallel planes.

In another preferred embodiment, a distillation unit is comprised of a set of cascades assembled in parallel. Each cascade includes elementary cells assembled alternately, in thermal series, in parallel assembly planes. As a result, each condensation zone of a cell (n) serves to heat the evaporation zones of two cells (n+1) placed on either side, each cascade starting with a heating cell and terminating in a cooling cell. All of the heating cells are fed in parallel, via a heat-transfer fluid, and all of the cooling cells are fed in parallel, via a coolant circuit.

In a particularly preferred embodiment, a distillation unit is provided which has a single cell with an evaporation zone which is inserted between two heating cells and a condensation zone which is inserted between two cooling cells. The entire assembly is surrounded by a layer of heat insulating material.

Irrespective of the embodiment which is chosen, the cells can all be held together in sealed contact by threaded rods extending between external assembly plates and which can be pressed together, for example, by compression members.

The present invention is further directed to a process for operating a distillation unit comprising one or more evaporation zones, and one or more condensation zones. The evaporation zones and the condensation zones are arranged vertically. The liquid to be distilled enters the upper part of the evaporation zone. The vapors produced in the evaporation zone are transferred horizontally, into the condensation zone, through a communicating structure. The condensed liquid then runs vertically down the walls of the condensation zone and is evacuated from the lower part of the condensation zone. The condensation zones can be maintained under reduced pressure in order to assist the horizontal transfer of the vapors from one zone to another.

The invention will be more clearly understood from the description which is provided below, with reference to the following figures.

BRIEF DESCRIPTION OF THE DRAWINGS

FIG. 1 is a diagrammatic view showing the principle of an elementary evaporation/condensation cell in accordance with the present invention.

FIG. 2 is a diagrammatic view showing the principle of a multiple-effect distillation apparatus in accordance with the present invention, which is formed by a battery of (x) cells of the type shown in FIG. 1 connected in parallel, and (y) offset cells of the type shown in FIG. 1 connected in thermal series.

FIG. 3 is a cross-sectional view, in a longitudinal plane, of a first embodiment of the present invention.

FIG. 4 is a cross-sectional view taken along the plane A—A in FIG. 3.

FIG. 5 is a cross-sectional view taken along the plane B—B in FIG. 3, corresponding to a five-effect distillation unit.

FIG. 7 shows a distillation unit of the present invention which is comprised of a single elementary cell.

FIG. 8 is a cross-sectional view taken along the plane C—C in FIG. 7.

FIG. 9 is a cross-sectional view taken along the plane D—D in FIG. 7.

DETAILED DESCRIPTION OF THE INVENTION

FIG. 1 schematically shows an example of an elementary evaporation/condensation cell (1). The cell (1) shown in FIG. 1 is a parallelepiped, with a thickness of 2 cm, contained between two metal plates (2, 3) which are two meters in height and one meter in width. The plates (2, 3) are separated by a spacer frame (4) made of plastic (for example, polypropylene). The spacer frame (4) is divided into two identical and distinct zones, an evaporation zone (EVAP) and a condensation zone (COND), by a longitudinal central member (7).

Figure 6:
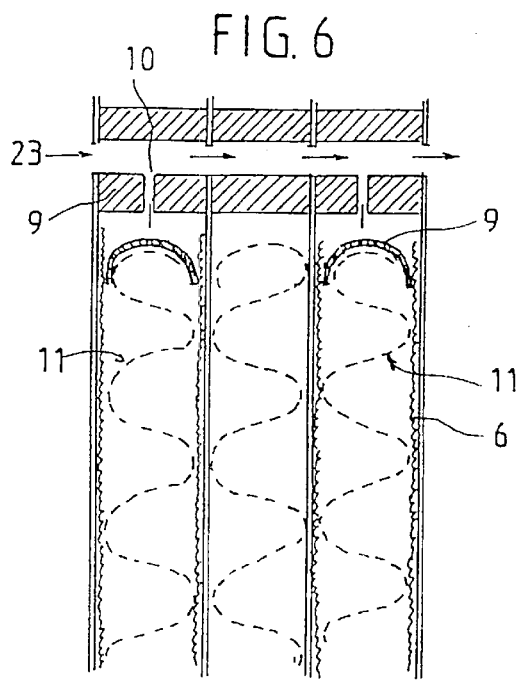
FIG. 6 is a detailed, cross-sectional view of the upper ends of three of the cells.
Figure 10:
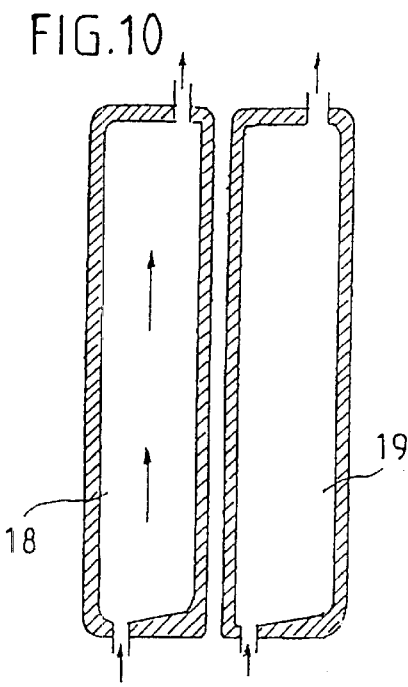
FIG. 10 shows, in vertical cross-section, the heating and cooling cells associated with the elementary cell shown in FIG. 7.

Referring to FIGS. 2 and 3, the evaporation zone (EVAP) of the cell (1) is fed with the fluid to be distilled via a feed circuit (23). The feed circuit (23) enters a manifold (8) which is defined in the spacer frame, for example, by a transverse member (9) drilled with a plurality of calibrated holes (10). The fluid to be distilled runs, as a thin film, down the two walls of the cell. The cell contains a porous packing, for example, the very wide-celled corrugated mesh (11) shown in FIG. 6. The porous packing is used, on the one hand, to prevent the collapse of cells maintained under vacuum, and on the other hand, to contribute to turbulent flow which improves heat transfer from the fluid during evaporation. It is also possible to provide members (6) on the walls of the cell, as shown in FIG. 6, which may or may not be incorporated into the walls, to provide the functions of a turbulence promoter and a falling-film stabilizer.

The condensation zone of the elementary cell has dimensions which are identical to those of the evaporation zone, and the two zones communicate with each other at the central member (7) of the spacer frame via a series of calibrated holes (12), to allow the evaporated fluid to pass into the condensation zone. A porous mat (13) (shown in FIGS. 3 and 7) is optionally placed in front of the holes (12), and constitutes an antipriming barrier, making it possible to prevent droplets of the fluid to be distilled from passing into the condenser. Excess brine or concentrate is recovered in the lower part of the evaporator, via a concentrate circuit (15), and the distilled fluid or distilled water is recovered in the lower part of the condenser via a distillate circuit (16) (also shown in FIG. 2).

To provide a modular apparatus, in accordance with the present invention, the elementary evaporation/condensation cells are assembled in thermal series so the condensation zones of the cells (n) heat the evaporation zones of the cells (n+1) of the same series of (y) cells. Only the first and last cells are, respectively, heated by an external heat-transfer fluid (the heat-transfer fluid line 14 shown in FIG. 2) and cooled by a coolant, such as the fluid to be distilled, for example (the coolant line 15 shown in FIG. 2). The heat-transfer fluid is, for example, steam and the coolant is, for example, sea water.

The elementary evaporation/condensation cells are also assembled in (x) cascades, to be assembled in parallel, each cascade comprising (y) cells assembled in thermal series. There is no theoretical limit to the number (x) of cascades in parallel nor to the number (y) of cells in thermal series in a cascade.

As a nonlimiting example, FIG. 5 shows four cascades assembled in parallel. Each cascade is formed by five cells, in thermal series, and starts with a heating cell (18) and terminates in a cooling cell (19). All of the heating cells (18) are fed in parallel via the heat-transfer fluid circuit (14) and all of the cooling cells (19) are fed in parallel via the coolant circuit (15).

The (y) cells (in thermal series) of a cascade are connected alternately and in two parallel assembly planes. In the first assembly plane, the heating cell (18), the cells $C_2$ and $C_4$ and the cooling cell (19) are adjacent to each other (by contact between the longitudinal members of their frames). In the second assembly plane, the cells $C_1$, $C_3$, $C_5$ are adjacent to each other, by contact between the longitudinal members of their frames. Furthermore, the condensation zone (COND-1, COND-2, COND-3 or COND-4) of a cell $C_n$ of one of the assembly planes is applied, over the entire surface of one of its walls, against one of the walls of the evaporation zone (EVAP-2, EVAP-3, EVAP-4 or EVAP-5) of the cell $C_{n+1}$ of an assembly plane of the same cascade or of the adjacent cascade. Each condensation zone of a cell (n; COND-n) then serves to heat the evaporation zones of two cells (n+1; EVAP-n+1) which are placed on either side of it.

The heating cell (18) and the cooling cell (19) have the same thickness as an elementary cell, but are half as long. One of their walls is applied against a wall of the evaporation zone (EVAP-1) of a first cell and against one of the walls of the condensation zone (COND-5) of a last cell, respectively.

In the embodiment shown in FIGS. 7 to 10, the apparatus of the present invention comprises a single cell (1). The cross-sections C—C and D—D show that a half-cell corresponding to the evaporation zone (EVAP) is inserted between two heating cells (18), and that the condensation zone (COND) is inserted between two cooling cells (19). The entire assembly is preferably surrounded by a layer of heat insulating material (5).

Figure 11:
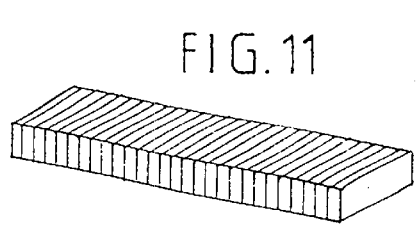
FIG. 11 is an overall view of a modular distillation unit comprised of plural cells of the present invention.

As an example, FIG. 11 shows the dimensions of a modular distillation unit produced in accordance with the present invention, which produces 500 tonnes per hour of distilled water and has the external shape of a parallelepiped 2 meters in height, 6 meters in length and 155 meters in width.

Figures 12, 14:
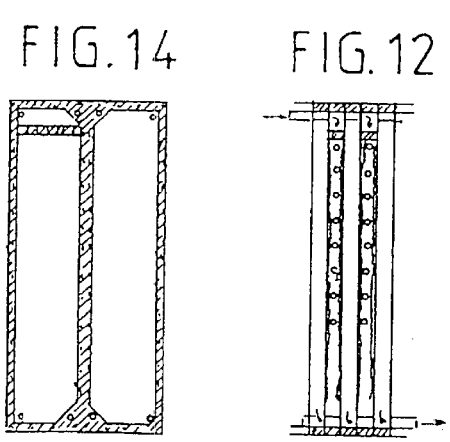
FIG. 12 is a partial, cross-sectional view of the distillation unit shown in FIG. 11, taken in a vertical plane.
FIG. 14 shows the spacer frame which is used in the distillation unit shown in FIGS. 12 and 13.
Figure 13:
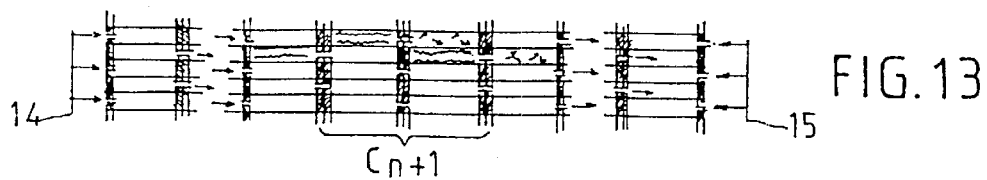
FIG. 13 is a partial, cross-sectional view of the distillation unit shown in FIG. 11, taken in a horizontal plane.

As a further example, FIGS. 12, 13 and 14 show elementary cells making up, for example, the distillation unit in FIG. 11 or in FIG. 2.

Figures 15, 16:
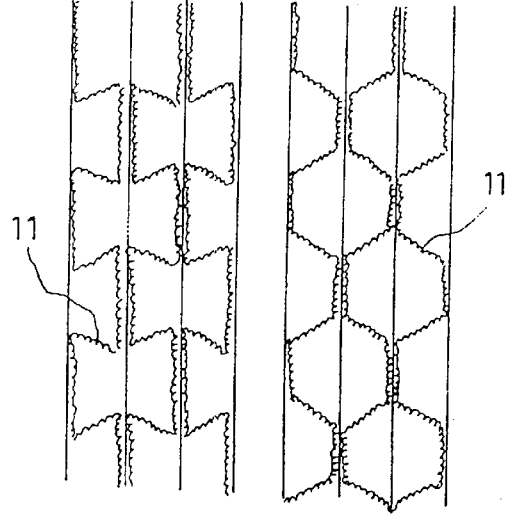
FIGS. 15 and 16 show embodiments of the internal porous packing.

Without departing from the scope of the invention, the spacer frame and the feed lines may be of different shapes, and the spacer frame need not be rectangular. The various fluid inlet and outlet lines may be directed horizontally (as shown in FIGS. 6, 12, 13 and 14) or vertically (as shown in FIGS. 3, 7 and 8), and may or may not be incorporated into the frame. The manifold (8) may be absent, or produced in different forms, for example, in the form of a perforated transverse member (as shown in FIGS. 3 and 14), of a transverse perforated tube (as shown in FIG. 7) or of a bent perforated plate (as shown in FIG. 6). The lower member of the frame can have one or more slopes in order to promote the downward flow of the fluids. The porous packing (11) can also be formed in different shapes (as shown in FIGS. 6, 15 and 16, for example.

It is also possible to produce elementary cells from two independent and structurally identical half-cells, with a series of holes in one of their vertical members. All that is required is to juxtapose the half-cells and to bring the communicating holes into coincidence. This method of assembly is therefore the same as that described above, and the elementary cell concept of the present invention will extend to both embodiments.

A distillation unit produced in accordance with the present invention has the following notable advantages.

A modular structure results from the assembly of a very large number of simple elementary components which are commercially available or which can easily be manufactured in high volume and for a low cost. The same elementary components could be used to produce distillation units having production capacities varying over a very wide range, in a ratio of 1 to 10,000.

The elementary components used mainly include the following. Flat sheets of conventional dimensions can be used, with no complex machining or welding. Such sheets can therefore be formed of scarce materials such as titanium, tantalum, or even wettable reinforced plastics, etc. The spacer frames (of a small thickness, for example 2 cm) can be made of metal or plastic (polyethylene, polypropylene, etc.). Their shape can vary, depending on optimization criteria or manufacturing constraints. The external assembly plates can be made with threaded rods (which could be made of mild steel, with very rough machining) or simple positioning rods, if necessary, held in place by suitable compression members. The feed and discharge pipes and connections for the elementary cells are of standardized dimensions, and can be manufactured in high volume.

Such elementary components are easily transportable, for a low cost, and can be assembled on site, without any welding and by local labor. The entire assembly can be easily dismantled for periodic inspection and cleaning. To facilitate such dismantling and maintenance, it is possible to provide a system of movement, for example horizontal rails, along which a number of cells can slide in order to carry out work in a given plane of the distillation unit.

The distillation unit of the present invention, even of a very large capacity, is in the form of a monobloc assembly, requiring no expensive framework. The handling, transportation and commissioning (assembly, fitting of connections, etc.) of elementary cells weighing a few tens of kilograms is minimal compared with what is necessary in existing plants for components weighing a few tens of tonnes.

What is claimed is:

1. A process for distilling a fluid in an apparatus having multiple-effect plates and including an evaporation zone and a condensation zone, comprising the steps of:

vertically arranging the evaporation zone and the condensation zone, and separating the vertically arranged evaporation zone and condensation zone with a longitudinal central member, forming a cell having fluid-receiving walls;

introducing the fluid to be distilled into an upper part of the evaporation zone so that the fluid runs as a thin film down the walls of the cell, condensing the fluid and producing vapors in the evaporation zone;

horizontally transferring the vapors produced in the evaporation zone into the condensation zone through calibrated holes provided in the central member; and evacuating the condensed fluid running vertically down the walls of the condensation zone from a lower part of the condensation zone.

2. The process of claim 1 which further includes the step of maintaining the condensation zone under a reduced pressure.

3. The process of claim 1 wherein the apparatus includes a plurality of evaporation zones and a plurality of condensation zones, and which further includes the steps of vertically arranging the plurality of evaporation zones and the plurality of condensation zones, and separating each of the plurality of evaporation zones and each of the plurality of condensation zones with the longitudinal central member.

4. The process of claim 1 wherein the fluid is briny water, and which further comprises the step of desalinating the briny water by distilling the fluid.

5. The process of claim 1 wherein the fluid is sea water, and which further comprises the step of desalinating the sea water by distilling the fluid.

6. An elementary cell for distilling a fluid, comprising:
two metal plates forming walls of the cell, a spacer frame separating the metal plates and holding the metal plates vertically, and a longitudinal central member dividing the spacer frame into two distinct zones including an evaporation zone and a condensation zone, wherein the evaporation zone and the condensation zone are substantially identical, and wherein the evaporation zone includes an upper part for receiving the fluid to be distilled;
a feed circuit communicating with the upper part of the evaporation zone, wherein the feed circuit enters the upper part of the evaporation zone so that the fluid to be distilled runs as a thin film down the walls of the cell, thereby condensing the fluid and producing vapors in the evaporation zone;
a plurality of calibrated holes provided in the central member, wherein the evaporation zone and the condensation zone communicate with each other through the plurality of calibrated holes provided in the central member so that the vapors produced in the evaporation zone are horizontally transferred into the condensation zone through the plurality of calibrated holes;
a concentrate circuit provided in a lower part of the evaporation zone, for recovering excess unevaporated fluid concentrated in the lower part of the evaporation zone; and
a distillate circuit provided in a lower part of the condensation zone, for evacuating the condensed fluid running vertically down the walls of the condensation zone and recovering the distilled fluid from the lower part of the condensation zone.

7. The elementary cell of claim 6 which further includes a manifold defined by a transverse member provided with the plurality of calibrated holes and fastened in the upper part of the cell between portions of the spacer frame and the central member, wherein the feed circuit enters the upper part of the evaporation zone through the manifold.

8. The elementary cell of claim 7 wherein the manifold is a tube provided with the plurality of calibrated holes and placed transversely in the upper part of the evaporation zone.

9. The elementary cell of claim 6 wherein the cell is maintained under reduced pressure.

10. The elementary cell of claim 9 which further includes a structural member for preventing collapse of the cell while maintained under the reduced pressure.

11. The elementary cell of claim 10 wherein the structural member is a wide-celled corrugated mesh placed inside the cell.

12. The elementary cell of claim 6 which further includes a porous mat applied to inside portions of the evaporation zone, against the central member and covering the surface having the plurality of calibrated holes.

13. The elementary cell of claim 6 which further includes a structural member for promoting turbulence and for stabilizing the film falling down the walls of the cell.

14. The elementary cell of claim 13 wherein the structural member is a porous packing.

15. A distillation unit comprising:
an elementary cell for distilling a fluid and including two metal plates forming walls of the cell, a spacer frame separating the metal plates and holding the metal plates vertically, and a longitudinal central member dividing the spacer frame into two distinct zones including an evaporation zone and a condensation zone, wherein the evaporation zone and the condensation zone are substantially identical, and wherein the evaporation zone includes an upper part for receiving the fluid to be distilled in the distillation unit;
a feed circuit communicating with the upper part of the evaporation zone, wherein the feed circuit enters the upper part of the evaporation zone so that the fluid to be distilled runs as a thin film down the walls of the cell, thereby condensing the fluid and producing vapors in the evaporation zone;
a plurality of calibrated holes provided in the central member, wherein the evaporation zone and the condensation zone communicate with each other through the plurality of calibrated holes provided in the central member so that the vapors produced in the evaporation zone are horizontally transferred into the condensation zone through the plurality of calibrated holes;
a concentrate circuit provided in a lower part of the evaporation zone, for recovering excess unevaporated fluid concentrated in the lower part of the evaporation zone; and
a distillate circuit provided in a lower part of the condensation zone, for evacuating the condensed fluid running vertically down the walls of the condensation zone and recovering the distilled fluid from the lower part of the condensation zone.

16. The distillation unit of claim 15 which includes a plurality of (y) elementary cells assembled in thermal series, wherein the condensation zone of a cell (n) of the thermal series heats the evaporation zone of a cell (n+1) of the thermal series, wherein the evaporation zone of a first cell in the thermal series is heated by a heating cell which receives an external heat-transfer fluid, and wherein the condensation zone of a last cell in the thermal series is cooled by a cooling cell which receives a coolant.

17. The distillation unit of claim 16 wherein the plurality of (y) elementary cells of the thermal series are alternately mounted in two parallel planes.

18. The distillation unit of claim 17 which includes a plurality of (x) cascades assembled in parallel, wherein each of the (x) cascades includes the plurality of (y) elementary cells alternately assembled in thermal series in the two parallel planes, wherein the condensation zone of each cell (n) heats the evaporation zone of two cells (n+1) placed on either side of the cell (n) and wherein each of the plurality of (x) cascades starts with a heating cell and terminates in a cooling cell, thereby providing a plurality of the heating cells and a plurality of the cooling cells, a heat-transfer fluid circuit communicating with the heating cells, for feeding all of the heating cells in parallel, and a coolant circuit communicating with the cooling cells, for feeding all of the cooling cells in parallel.

19. The distillation unit of claim 15 which includes a plurality of elementary cells, and external assembly plates for holding the elementary cells together in sealed contact.

20. The distillation unit of claim 15 which includes a combination of a plurality of elementary cells for forming modular distillation units of different capacities.

21. The distillation unit of claim 15 having a single elementary cell with the evaporation zone inserted between two heating cells and with the condensation zone inserted between two cooling cells, and which further includes a layer of heat insulating material surrounding the single elementary cell.

22. The distillation unit of claim 15 which further includes a system for moving the elementary cell.

* * * * *